United States Patent [19]

Dorman et al.

[11] 4,067,225
[45] Jan. 10, 1978

[54] CAPACITANCE TYPE NON-CONTACT DISPLACEMENT AND VIBRATION MEASURING DEVICE AND METHOD OF MAINTAINING CALIBRATION

[75] Inventors: Richard A. Dorman, Troy; Curtis D. Kissinger, Gloversville; Lawrence J. Lagace, Jr., Albany, all of N.Y.

[73] Assignee: Mechanical Technology Incorporated, Latham, N.Y.

[21] Appl. No.: 779,748

[22] Filed: Mar. 21, 1977

[51] Int. Cl.$^2$ .................... G01B 7/22; G01H 11/00
[52] U.S. Cl. .................... 73/1 DV; 73/645; 324/61 R; 361/280
[58] Field of Search .......... 324/61 R, 61 P; 323/93; 340/200; 73/71.4, 1 R, 1 DV; 361/278, 280

[56] References Cited
U.S. PATENT DOCUMENTS

| | | | |
|---|---|---|---|
| 3,400,331 | 9/1968 | Harris | 324/61 R |
| 3,626,287 | 12/1971 | Di Niro | 324/61 R |

*Primary Examiner*—James J. Gill
*Attorney, Agent, or Firm*—Joseph V. Claeys

[57] ABSTRACT

A new capacitance type non-contact displacement and/or vibration measurement instrument sensing head is described together with a novel method of maintaining calibration of the instrument using such sensing head. The invention takes the form of a central probe member having a first guard ring disposed in coaxial, electrically insulated relationship about the central probe member and driven at the same potential and frequency as the probe member. A secondary driven guard ring coaxially surrounds the first guard ring and is electrically isolated from it and is driven at the same alternating current frequency but at a higher voltage of the order of 1.5 to 1 times higher. The additional secondary guard ring, driven at a suitably boosted voltage level and the same frequency as the central probe member, serves to focus the otherwise divergent electric field, thus producing a very significant improvement in the output linearity when operated at relatively large displacements. Experiments have shown that a probe in accordance with the invention of 1 inch overall diameter can now be used to measure displacements up to approximately 1 inch, whereas previously a probe of the similar outside diameter could be used to measure displacements of only approximately 1/10 of an inch, unless some form of electronic linearization of its output was employed. With the improved sensing head assembly of this invention calibration of the instrument can be more easily maintained by simply removing the probe from a measurement position, applying a ground potential to the secondary guard ring and adjusting the output of the instrument to a fixed reference value to thereby recalibrate the instrument.

9 Claims, 6 Drawing Figures

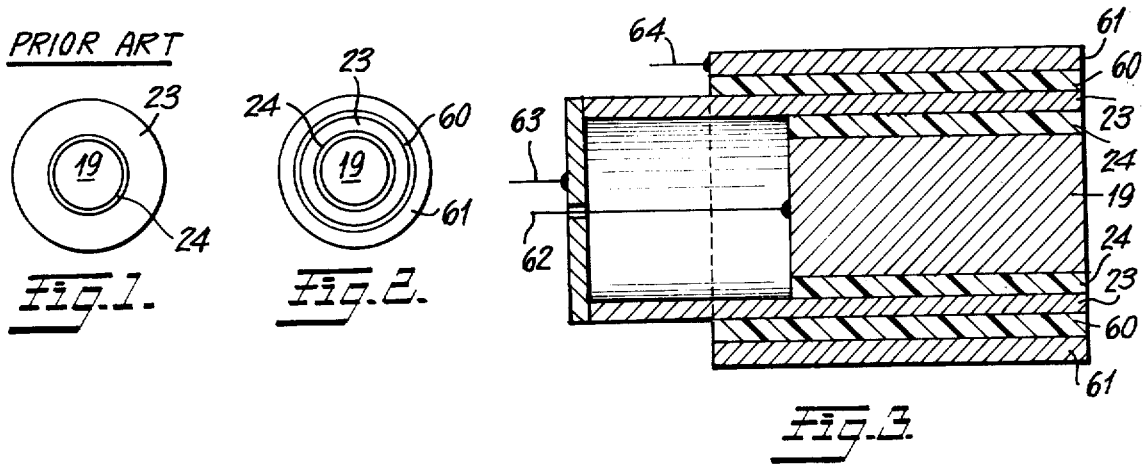
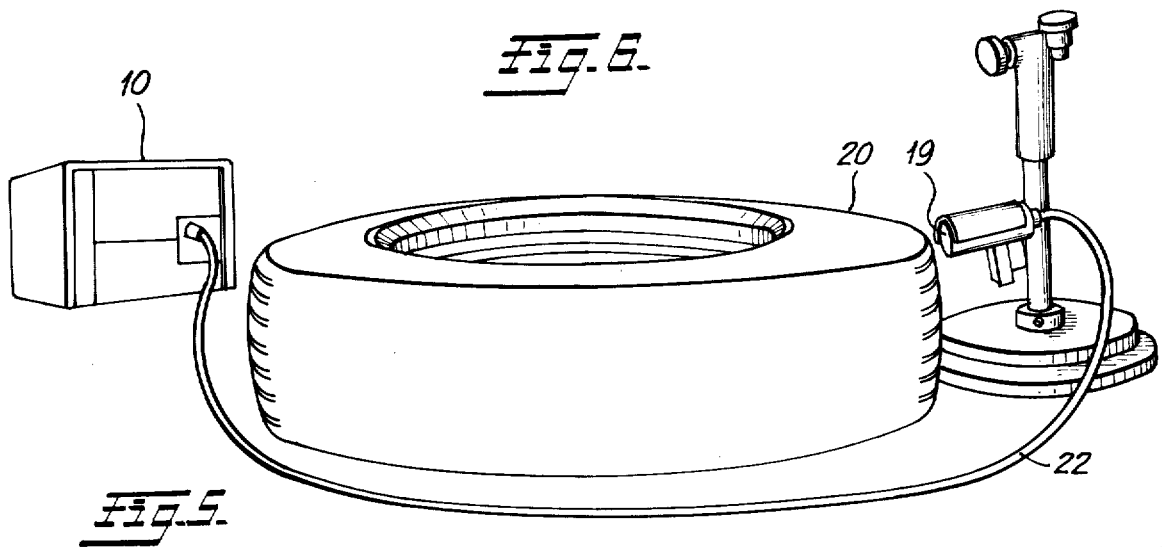
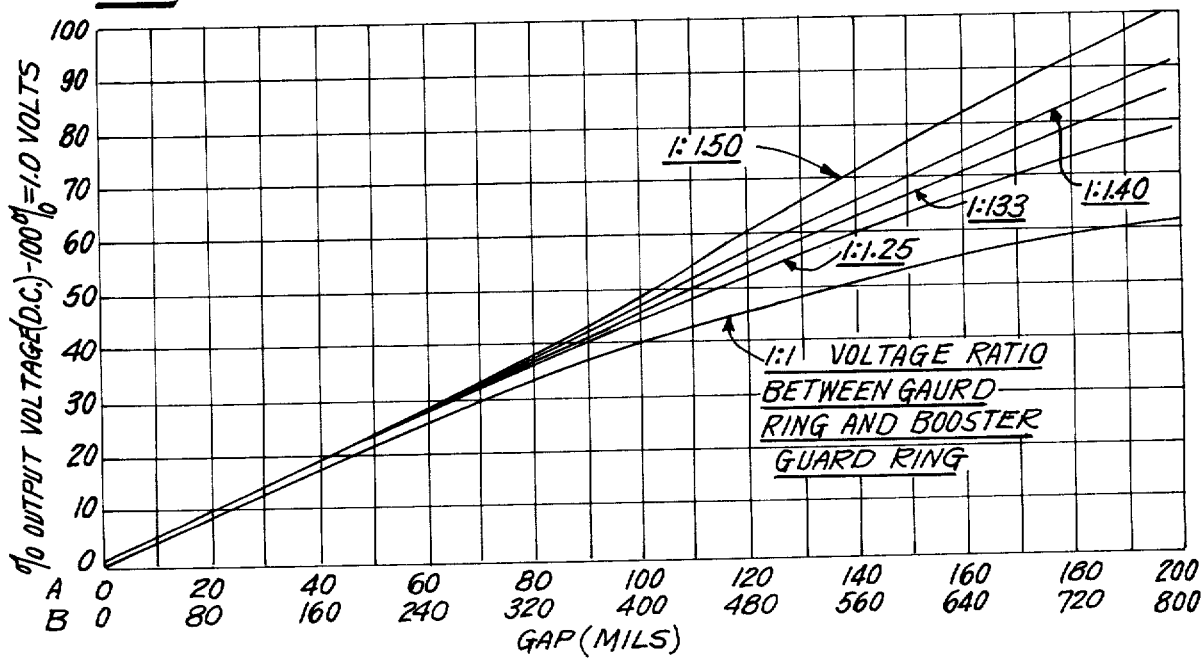

4,067,225

CAPACITANCE TYPE NON-CONTACT DISPLACEMENT AND VIBRATION MEASURING DEVICE AND METHOD OF MAINTAINING CALIBRATION

BACKGROUND OF INVENTION

1. Field of Invention

This invention relates to capacitance type, non-contact displacement and/or vibration measuring instruments.

More particularly, the invention relates to a novel sensing head assembly for such instruments and to a new and improved method of maintaining calibration of such instruments employing the novel sensing head assembly.

2. PRIOR ART PROBLEM

A known, prior art capacitance type, non-contact displacement and vibration measuring instrument is described in U.S. Pat. No. 3,048,775 issued Aug. 7, 1962 to R. Calvert and entitled "Apparatus for Measuring Small Distances". The capacitance type, non-contact displacement measuring instrument described in U.S. Pat. No. 3,048,775, as well as in other known instruments of the same type, require either a much larger sensor surface area relative to the desired measurement range, or the use of an electronic linearizer in the instrument processing circuitry in order that the instrument provide a linear output over a comparatively large physical displacement range. For example, one such known instrument requires that the probe sensing electrode area be in the order of 1.5 square inches in area for each inch of displacement sensing range. The relatively large probe area/displacement range size requirement often leads to serious restrictions or limitations in the use of such instruments in experimental and commercial applications. Another known device requires the use of an electronic linearizer in the processing circuitry used in the instrument in order that a more favorable relationship between sensor size and measurement range can be obtained. However, the use of the linearizer in the processing circuitry introduces calibration problems, operational difficulties, circuitry complexity and increased cost.

With either of the above briefly discussed known capacitance type, non-contact displacement and vibration measuring instruments, it is customary to employ a "driven guard" sensing probe assembly such as that shown in FIG. 1 of the drawings in order to prevent errors that otherwise would be introduced due to such variables as connector cable capacitance and stray circuit capacitance. Electrical design considerations dictate that in order to achieve the desired result of cancellation of these error producing factors, the "driven guard" ring must be operated at a one to one voltage and phase relationship relative to the excitation signal applied to the central sensor probe electrode. Thus, it is customary to apply the same excitation signal to both the central sensor electrode probe member and the "driven guard ring" that surrounds the central sensor electrode probe member. This known practice tends to minimize the classical fringe effect present in a parallel plate capacitor system and results in a substantially homogeneous electrostatic field across the central sensing electrode probe member. The difficulty with the system arises in measurement applications involving rather large physical displacements in excess of 100 milli-inches (0.1 inches) due to the fact that when operating such known systems at large ranges in excess of the 100 milli-inches, divergence of the electrostatic field at the driven guard ring which surrounds the central sensing electrode probe, introduces non-linearities which are not overcome short of introducing additional circuit complexity in the processing circuitry of the instrument. To overcome this problem and at the same time extend the range of physical displacement which can be measured accurately with the instrument without undue additional complexity and additional cost, the present invention was devised.

SUMMARY OF INVENTION

It is therefore a primary object of the invention to provide a new and improved non-contact displacement and vibration measuring instrument sensing head assembly. A further object of the invention is to provide a new and improved method of maintaining calibration of such instruments using the novel sensing head assembly.

The new sensing head assembly which overcomes many of the undesirable characteristics of the known prior art devices, takes the form of a secondary driven guard ring surrounding the normal driven guard ring, but driven at a higher voltage level than the normal (or primary) guard ring. The electrical signal applied to the secondary guard ring is at the same frequency and phase as the excitation voltage applied to the central probe member and the primary guard ring, but since its voltage is greater, it is referred to as a "boosted guard ring". It has been shown experimentally, that the additional boosted guard ring, driven at a suitably boosted voltage level, serves to focus the otherwise divergent electrical field produced by the central probe member at the larger displacement distances, thus producing a very considerable improvement in output linearity when the instrument is operated at relatively large displacements. These experiments have shown that a probe of 1 inch overall diameter, when modified according to the invention, can be used to measure displacements up to approximately 1 inch, whereas previously a probe of the same outside diameter operated according to the prior art devices, could be used to measure only approximately 1/10 of an inch, unless electronic linearization were incorporated in the instrument processing circuitry.

In practicing the invention a new and improved capacitance type non-contact displacement and vibration measurement instrument sensing head assembly is provided. The sensing head assembly comprises a central probe member having an exposed end defining a capacitor electrode for physical placement adjacent a conductive member coacting with the central probe member exposed end as an opposed capacitor electrode to form an electrical capacitance therebetween whose capacitance value is representative of the physical displacement between the exposed end of the central probe member and the conductive member. A first insulating layer surrounds the unexposed surfaces of the central probe member and a first conductive guard ring having an exposed surface surrounds the first insulating layer adjacent the exposed end of the central probe member and is electrically isolated from the central probe member. A second insulating layer surrounds the unexposed surfaces of the first guard ring and a second conductive guard ring having an exposed surface surrounds the second insulating layer adjacent the exposed end of the central probe member and the first guard ring exposed surface so that is surrounds and is electrically isolated from both the central probe member and the first guard ring. Means are provided for applying a first alternating current potential of substantially the same voltage value and frequency to the central probe member and the first guard ring and means are provided for applying a second alternating current potential of substantially the same frequency and phase but of higher voltage value to the second guard ring.

In a preferred embodiment of the invention the exposed end of the central probe member, the exposed surface of the first guard ring and the exposed surface of the second guard ring all lie in the same plane. The voltage applied to the second guard ring is higher in value than the voltage of the alternating current potential applied to the central probe member and the first guard ring by a factor of the order of 1.5 to 1 and is an alternating current potential of substantially the same frequency and phase as that applied to the central probe member and first guard ring.

Using the new and improved sensing head assembly, a novel method of maintaining calibration is made available wherein the sensing head assembly is removed from a conductive member with respect to which physical displacement is to be measured, ground potential is applied to the second conductive guard ring, a measure of the instruments output voltage while thus aligned is derived and the gain of the instrument is adjusted to change the output voltage of the instrument while thus aligned to a fixed reference voltage value to thereby recalibrate the instrument.

BRIEF DESCRIPTION OF DRAWINGS

Other objects, features and many of the attendant advantages of this invention will be better understood upon a reading of the following detailed description when considered in conjunction with the accompanying drawings wherein like parts in each of the several figures have been identified by the same reference character, and wherein:

FIG. 1 is a diagrammatic end view of a prior art probe member employing the sensing head assembly of a known capacitance type, non-contact measuring instrument;

FIG. 2 is a diagrammatic end view of a sensing head assembly constructed according to the invention;

FIG. 3 is a longitudinal sectional view of the sensing head assembly shown in FIG. 2;

FIG. 5 is a series of voltage vs. physical displacement characteristic curves indicating the improvement in measurement capability achieved with the invention; and FIG. 6 is a schemtic functional block diagram illustrating the use of the instrument in a measurement application.

DETAILED DESCRIPTION OF PREFERRED EMBODIMENT

Figure 4:
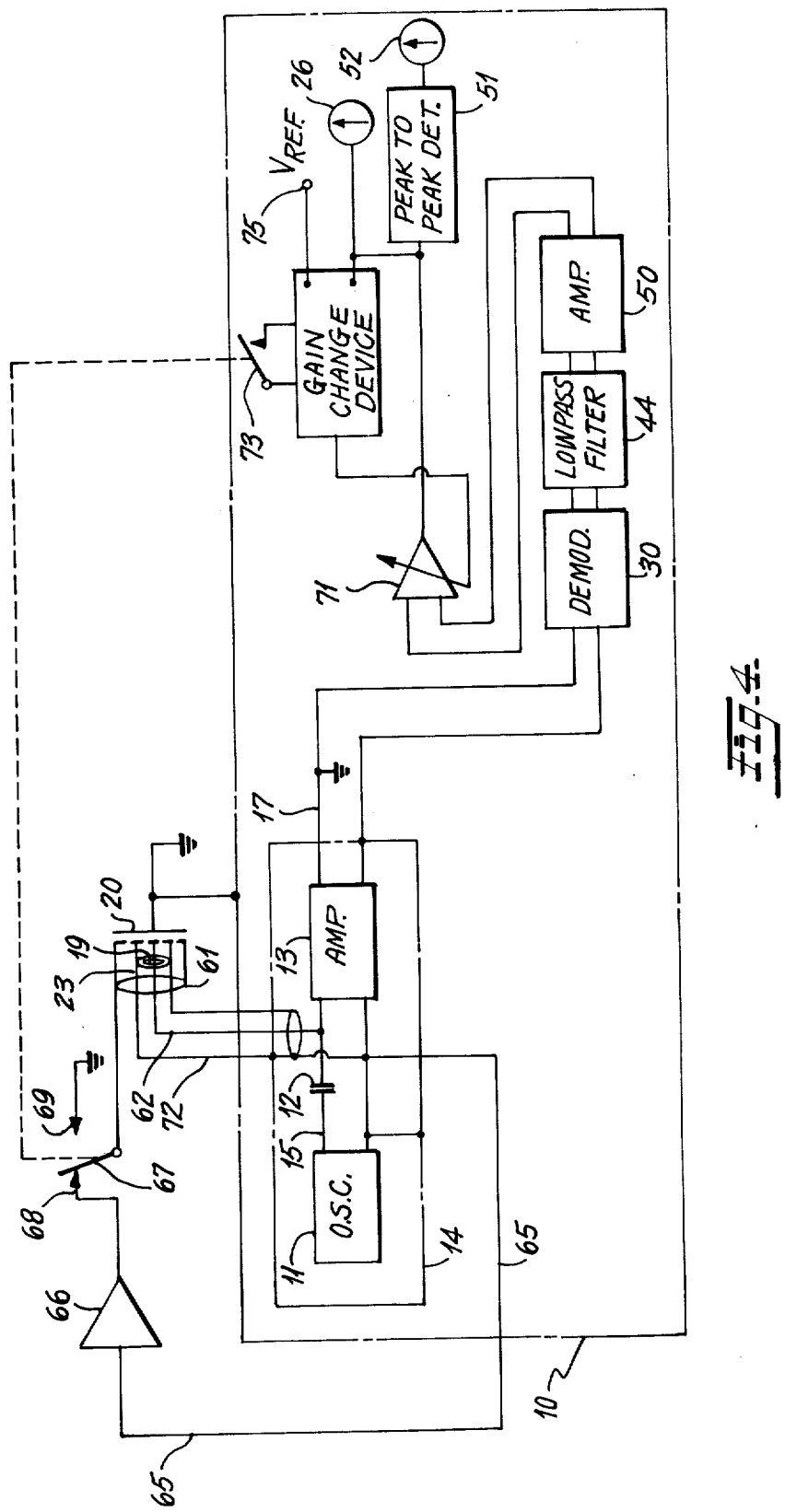
FIG. 4 is a schematic, functional block diagram of modified sensing circuitry for use in a measuring instrument according to the invention.

FIG. 1 is an end view of a prior art sensing head assembly comprised by a solid, cylindrically shaped, conductive central probe member 19 having an exposed end surface. The cylindrically shaped side surfaces of the central probe member 19 are surrounded by a thin insulating layer of dielectric material 24 that in turn is surrounded by a guard ring 23 of conductive material. The guard ring 23 has an exposed end surface which is preferably coplanar with the exposed end surface of the central probe member 19. In operation, the sensing head assembly is excited from suitable measuring circuitry such as that described in detail in the above identified U.S. Pat. No. 3,048,775, and reference is made to this patent for a more detailed description of the construction and operation of this prior art device.

As stated earlier with respect to the prior art device, the probe sensing electrode area must be in the order of 1.5 square inches per inch of sensing range. Thus, with a prior art sensing probe as shown in FIG. 1 having an outside diameter of approximately 1 inch, physical displacements of only approximately 1/10 of an inch can be measured without the use of some form of electronic linearization. It has been determined that the primary cause of the non-linearity occurring in the present known measurement systems when operating at large ranges, is due to the divergence of the electrostatic field at the guard ring which surrounds the sensor and that the degree of divergence is a function of the size of the surrounding guard ring relative to the area of the central probe member.

As a result of the above mentioned discoveries, the new and improved sensing head assembly shown essentially in FIG. 2 and 3 of the drawings was devised. This improved sensing head assembly is comprised by a central, solid, cylindrically shaped conductive probe member 19 of stainless steel or other similar conductive material having an exposed end surface. The cylindrically shaped sides of the central probe member 19 are covered with a thin layer of dielectric material 24 which in turn is surrounded by a first hollow cylindrical conductive guard member 23 that is concentrically arranged around central probe member 19 and the first insulating layer 24 and has an exposed end surface which is preferably coplanar with the exposed end surface of the central probe member 19. A second thin insulating layer of dielectric materials 60 surrounds the cylindrical side surfaces of the first guard ring 23 and a second concentric hollow cylindrical conductive guard ring 61 surrounds the second insulating layer. The second guard ring 61 likewise has an exposed end surface which is preferably coplanar with the exposed end surfaces of the first guard ring 23 and the central probe member 19. The assembly thus comprised may have any desired dimension in the axial direction away from the coplanar exposed end surfaces of the inner probe member and the first and second guard rings but usually is of sufficient length to allow the assembly to be grasped firmly in the hand of a user or a clamp for the instrument and preferably also includes an outer insulating layer (not shown) for electrically isolating the user of the assembly or a mounting clamp from the conductive surfaces. In addition, terminal means shown at 62, 63 and 64 are provided for applying electric energizing potentials to the respective central probe member 19, first guard ring 23 and second guard ring 61 all of which are electrically isolated one from the other.

At this point in the description, it should be understood that the face or end surface of the probe is the effective sensing portion so that the length of the central probe member 19 as well as the lengths of the concentrically arranged first and second guard rings 23 and 61 and the intervening insulating layers 24 and 60 are a matter of choice of the designer from a purely mechanical standpoint. Moreover, all of these members may be coextensive in axial length and of course their composite outside diameter can be varied in accordance with the needs of a particular measurement application. The configuration shown in FIGS. 2 and 3 is merely one which has been determined to be suitable for a known measurement application. Preferably, the inner and outer guard rings exposed conductive surfaces are substantially coplanar with the exposed conductive surface of the central probe member 19 which is the active portion of the sensing head assembly. For some specialized measurement situations, however, it may be desirable to so shape the exposed end of the sensing head assembly that it conforms to a complementary shaped surface whose displacement is to be measured. With such a device, the exposed end surfaces of the first and second guard rings 23 and 61 may or may not be coplanar with the exposed surfaces of the central probe member 19 depending of course upon the specialized shaping provided to the active end of the probe assembly.

FIG. 4 of the drawings is a schematic, functional block diagram of a suitable measuring circuit for use with the sensing head assembly of the invention. The measuring circuit shown in FIG. 4 in a number of essential details is similar to the measuring circuit described in the above referenced U.S. Pat. No. 3,048,775. It is to be understood, however, that the invention is not restricted to use with a measuring circuit such as that shown in FIG. 4 for the circuit is illustrative of only one known suitable energizing and measurement circuit that can be employed in conjunction with the novel sensing head assembly by suitable modification as shown in FIG. 4. In addition, because of the novel features of the invention, a new and improved method of maintaining calibration of the measurement circuitry is made possible as will be explained more fully hereinafter.

The excitation and measurement circuit shown in FIG. 4 comprises an oscillator 11 mounted within an inner conductive shielding box 14 and having its output coupled through a first conductor 15 and capacitor 12 to one input of an amplifier 13 and through a conductor 16 to a second input of the amplifier 13. The amplifier 13 likewise is mounted within the inner conductive shielding box 14 which is maintained at the same potential as the conductor 16. The oscillator 11 is designed to provide a substantially constant voltage output at a suitable frequency, such as for example about 50 kilohertz. Amplifier 13 is designed to provide a phase reversal between its output and its input and has its output connected to ground through a conductor 17. The first input terminal of amplifier 13 which is coupled to the standard capacitor 12 also is connected directly by the inner conductor of a coaxial cable to the central probe member 19 of the sensing head assembly, and the inner guard ring 23 is connected through outer conductor 22 of the co-axial cable to the conductor 16. Conductor 16 also is connected through a conductor 65 and amplifier 66 to a selector switch 67 having a normally closed contact 68 connected to the output of amplifier 66 and having its movable contact connected directly to the second guard ring 61. A second normally open contact 69 of selector switch 67 is connected directly to ground whereby the outer second guard ring 61 can be grounded. The element 20 shown in FIG. 4 represents a conductive body whose distance from the probe end is to be sensed with the sensing head assembly and for this purpose, the conductive body 20 is connected directly to ground. As a consequence of this arrangement, the physical space between the conductive body 20 and the exposed end surface of the central probe member 19 defines an electrical capacitance whose capacitance value is determined by the physical magnitude of the space as explained more fully in the above referenced U.S. Pat. No. 3,048,775.

In operation, the output voltage of the amplifier 13 will bear a ratio to the input voltage (which is constant and known) and this in turn is equal to the ratio of the capacitance of the capacitors 12 and 18 wherein 18 is the capacitance value defined by the space between the central probe member 19 and the conductive body 20, the distance to which is to be measured. Since the output voltage of the oscillator 11 is constant and known, the current through the standard capacitor 12 is constant and the voltage at the output of amplifier 13 will be inversely proportional to the capacitance of the capacitor 18, and hence directly proportional to the spacing between the end of probe member 19 and the body 20.

The measuring circuitry of FIG. 4 includes a demodulator 30, low pass filter 44, amplifier 50, variable gain amplifier 71, peak-to-peak detector 51 and indicating instrument 52 for use in measuring vibratory motion of a body and an indicating instrument 26 for measuring the displacement or distance between the probe face and the body.

Briefly, the operation of the measuring circuitry shown in FIG. 4 can be explained as follows. As stated above, the output voltage of the amplifier 13 will bear a ratio to the input voltage in proportion to the ratio of the capacitance of the capacitor 18 to the capacitor 12. Since the output voltage of the oscillator 11 is constant, the current through the standard capacitor 12 is constant and the voltage at the amplifier 13 output is inversely proportional to the capacitance of the capacitor 18 and hence directly proportional to the spacing between the end of the center probe member 19 and the body 20 which is the distance desired to be measured. The proportionality factor of the ratio may be calculated knowing the area of the end of the center probe member 19, which normally is much smaller than the surface area of the body 20, the capacitance of the standard capacitor 12 and the output voltage of the oscillator 11. The output voltage of the amplifier 71 is measured by the indicating instrument 26 which is calibrated directly in units of distance.

During operation, the coaxial cable conductor 22 supplying the guard ring 23 shields the center probe member 19 from any stray capacitance to earth. The electrical signal applied to the second or outer guard ring 61 through amplifier 66 and conductor 65 is at the same frequency and phase as the voltage applied to the primary guard ring and the center probe member 19, but is at a higher voltage value. While thus energized, the second or outer guard ring serves to focus the otherwise divergent electric field between the center probe member 19 and body member 20, thus producing a very considerable improvement in output linearity while operated at relatively large displacements from the body member. It has been shown that a probe constructed as shown in FIGS. 2 and 3 having a 1 inch overall diameter can be used to measure displacements up to approximately 1 inch, whereas previously, probes of the same outside diameter constructed as shown by the prior art FIG. 1 could be used to measure displacements of up to only 1/10 of an inch, unless electronic linearization means were incorporated in the processing circuitry together with the attendant complexity and increased expense.

FIG. 5 of the drawings illustrates the considerable improvement in output signal linearity obtained with the "boosted secondary guard ring" system operating at relatively large displacements, and shows how the output linearity can be varied in proportion to the ratio of the voltage applied to the secondary guard ring relative to the voltage applied to the primary guard ring. In FIG. 5, a sensing head assembly was employed having a 0.4 inch diameter center probe member 19 with the outside diameter of the overall assembly being increased to 1 inch by the first and second guard rings and their associated insulating layers as shown in FIGS. 2 and 3. The results obtained were with an 8 foot coaxial cable lead between the sensing head assembly and measuring circuitry similar to that shown in FIG. 4. From an examination of FIG. 5, it will be seen that with only a one to one (1:1) voltage ratio between the inner guard ring and the outer boosted guard ring, linearity falls off at a displacement distance of the order of 60 mils (milli inches). However, by increasing the value of the voltage applied to the second or outer boosted guard ring up to a ratio of 1.5 to 1 (1.5:1) relative to the first or inner guard ring, linearity of the output voltage can be improved all the way out to over 800 mils displacement between the sensing head assembly and the member whose displacement is to be measured.

In addition to the demonstrated advantages for the improved sensing head assembly as discussed above for the measurement of increased displacement ranges, the same principle can be extrapolated for application to measurement problems in which it is desireable to employ a smaller sensing head assembly for any given sensing range than may be used with present systems. The reduced sensing head assembly size thus can be employed to permit measurements of smaller targets or measurement of much smaller area of a large target surface, than heretofore could be achieved with known sensing head assemblies.

FIG. 6 of the drawings is a rough schematic sketch illustrating the use of the invention in one known measurement application wherein the long-range, capacitive, non-contact displacement measuring system is employed to examine a rotating tire for radial run out. In this arrangement, the tire would constitute the body member 20 which when placed adjacent the face of center probe member 19 forms the capacitance whose value is to be measured. The sensing head assembly including probe member 19 is coupled through the conductors 22 and 65 to the measuring circuitry 10 as explained previously with respect to FIG. 4.

When used in environments such as that illustrated for the measurement application shown in FIG. 6, it is not unlikely that the active face of the sensing head assembly will accumulate dirt, dust and other particulate objects which can effect seriously the inter-electrode capacitance between the center probe member 19 and the inner first guard ring 23 and outer second guard ring 61. It will be understood that when such particulates accumulate to a substantial extent, cleaning of the face of the probe is required. However, for normal measurement purposes, it is neither convenient nor practical to continuously clean the face of the sensing head assembly probe.

The invention makes possible the use of an easily operated and inexpensive recalibration arrangement that involves the use of the selector switches 67 and 73, the gain change device 72 and the variable gain amplifier 71. If while measurements are being made, the user of the instrument suspects the buildup of debris on the face of the sensing head probe assembly, the switch 67 is closed on the fixed contact 69 so that the outer guard ring 61 is grounded, and the probe assembly face is removed from the presence of the conductive body member 20. The switch contact 67 is mechanically interconnected with the selector switch 73, which through suitable internal circuitry in gain changing device 72, causes amplifier 71 to change gain in accordance with the difference between the output of amplifier 71 and the value of reference voltage 75 to thereby recalibrate the output of the indicating device 26 to the reference level. It is of course possible to do the same job manually and eliminate the cost and need for the gain change device 72 and the interconnection between that device and the variable gain amplifier 71. While a mechanical interconnection is shown whereby the gain change device can be in the form of a stepping motor for rotating a potentiometer arm on the variable amplifier device 71, it is believed obvious to one skilled in the art that an all electrical gain change arrangement could be employed with comparable results and perhaps at less expense. Also, it would be possible to eliminate the selector switch 73 and gain change device 72 altogether and have the operator, by observation of the output of the indicating device 26, manually adjust the gain of amplifier 71 to correct for the changed interelectrode capacitance due to the accumulation of debris on the face of the sensing head assembly. In a busy workshop, however, the additional expense of the gain change device and selector switch 73 is believed justified whereby only a simple switch over to ground the outer boost guard ring 61 and removal of the sensing assembly from the presence of an adjacent conductive member 20 is required on the part of the operator and thereafter have the semiautomated measuring circuitry appropriately adjust the gain of amplifier 71 to quickly and easily recalibrate the instrument. Thereafter, the switches 67 and 73 are returned to the normally closed positions as shown in FIG. 4 and the instrument is again ready to perform required measurement.

From the foregoing description it will be appreciated that the invention provides a new and improved non-contact displacement and vibration measuring instrument sensing head assembly which makes possible the use of the instrument to perform displacement and vibration measurement at greatly extended ranges of displacement. In addition, the invention makes possible a new and improved method of maintaining calibration of such instruments during service whereby the use of the instrument under shop conditions is greatly facilitated.

Having described one embodiment of a new and improved capacitance type non-contact displacement and vibration measuring device and method of maintaining its calibration according to the invention, it is believed obvious that other modifications and variations of the invention will be suggested to those skilled in the art in the light of the above teachings. It is therefore to be understood that changes may be made in the particular embodiment of the invention described which are within the full intended scope of the invention as defined by the appended claims.

What is claimed is:

1. In a capacitance type non-contact displacement and/or vibration measurement system of the type including a sensing head wherein a central sensing probe member having an exposed end defining a capacitor electrode for physical placement adjacent a conductive member coacting with the exposed end of said central sensing probe member as an opposed capacitor electrode to establish an electrical capacitance therebetween, the value of which is representative of the physical distance between the exposed end of said sensing probe member and the adjacent conducting member, and wherein a first electrically conductive guard ring is disposed in coaxial, electrically insulated relationship about said central sensing probe member and wherein an alternating current potential of substantially the same voltage value and frequency is applied to said central probe member and to said first guard ring, the improvement comprising:

a. A second electrically conducting guard ring disposed in coaxial, electrically insulated relationship about said first guard ring; and b. Means applying an alternating current potential to said second guard ring having a value which is higher than the alternating current potential applied to said central probe member and said first guard ring.

2. The capacitance type non-contact displacement and/or vibration measurement system according to claim 1 wherein a first electrically insulating layer surrounds the unexposed surfaces of said central probe member, said first electrically conductive guard ring has an exposed surface surrounding said first electrically insulating layer adjacent the exposed end of the central probe member and electrically isolated from said central probe member, a second electrically insulating layer surrounds the unexposed surfaces of said first guard ring, said second electrically conductive guard ring has an exposed surface surrounding said second electrically insulating layer adjacent the exposed end of the central probe member and first guard ring exposed surface and surrounding and electrically isolated from said central probe member and said first guard ring.

3. A capacitance type non-contact displacement and/or vibration measurement system according to claim 2 wherein the central probe member comprises an elongated cylindrically shaped member, the first electrically insulating layer covers substantially the entire surface of said elongated cylindrically shaped central probe member surrounded by the first guard ring with the exception of one exposed end surface thereof, the first guard ring comprises an annularly shaped electrically conductive ring surrounding the insulated cylindrically shaped central probe member adjacent the exposed end surface thereof, the second electrically insulating layer substantially covers the first guard ring with the exception of the exposed annularly shaped surface thereof adjacent the exposed end of the elongated central probe member and the second guard ring comprises a second annularly shaped electrically conductive ring of larger diameter than said first guard ring and has an exposed electrically conductive surface surrounding both the exposed surface of the first guard ring and the exposed end of the elongated central probe member.

4. A capacitance type non-contact displacement and/or vibration measurement system according to claim 2 wherein the exposed end of the central probe member, the exposed surface of the first guard ring and an exposed surface of the second guard ring all lie in the same plane.

5. A capacitance type non-contact displacement and/or vibration measurement system according to claim 3 wherein the exposed end of the central probe member, the exposed surface of the first guard ring and an exposed surface of the second guard ring all lie in the same plane.

6. A capacitance type non-contact displacement and/or vibration measurement system according to claim 1 wherein the voltage of the alternating current potential applied to the second guard ring is higher in value than the voltage of the alternating current potential applied to the central probe member and first guard ring by a factor of the order of 1.5 to 1.

7. A capacitance type non-contact displacement and/or vibration measurement system according to claim 4 wherein the voltage of the potential applied to the second guard ring is higher in value than the voltage of the alternating current potential applied to the central probe member and first guard ring by a factor of the order of 1.5 to 1 and is an alternating current potential of substantially the same frequency and phase as that applied to the central probe member and first guard ring.

8. A method of maintaining calibration of a capacitance type non-contact measurement system employing a sensing head according to claim 1 comprising the steps of:

a. Moving the sensing head away from an electrically conductive member with respect to which physical distance is to be measured;

b. Bringing said second electrically conducting guard ring to a point of ground potential;

c. Measuring the output voltage of the system while thus arranged;

d. Adjusting the gain of the system to change the output voltage of the system while thus aligned to a fixed reference to thereby recalibrate the system.

9. The method of maintaining calibration of a capacitance type non-contact measuring system according to claim 8 wherein the gain of the system is adjusted automatically in response to the output voltage while thus aligned to a fixed reference to thereby recalibrate the system.

* * * * *